United States Patent [19]

Bienfait

[11] 4,258,159

[45] Mar. 24, 1981

[54] PROCESS FOR THE POLYMERIZATION OF OLEFINS

[75] Inventor: Charles Bienfait, Vilvoorde, Belgium

[73] Assignee: Solvay & Cie, Brussels, Belgium

[21] Appl. No.: 637,636

[22] Filed: Dec. 4, 1975

Related U.S. Application Data

[63] Continuation of Ser. No. 414,997, Nov. 12, 1973, abandoned.

[30] Foreign Application Priority Data

Nov. 24, 1972 [LU] Luxembourg .......................... 65548
Jun. 6, 1973 [LU] Luxembourg .......................... 67751

[51] Int. Cl.³ .......................... C08F 4/02; C08F 10/02
[52] U.S. Cl. .......................... 526/114; 252/429 C; 526/115; 526/116; 526/119; 526/121; 526/124; 526/125; 526/352
[58] Field of Search .............. 526/114, 115, 116, 119, 526/121, 124, 125

[56] References Cited

U.S. PATENT DOCUMENTS

| 3,705,886 | 12/1972 | Kashiwa et al. | 526/124 |
| 3,803,105 | 4/1974 | Galli et al. | 526/125 |

FOREIGN PATENT DOCUMENTS

| 2000566 | 11/1970 | Fed. Rep. of Germany . |
| 2123357 | 12/1971 | Fed. Rep. of Germany . |
| 2146686 | 4/1972 | Fed. Rep. of Germany . |
| 1264416 | 2/1972 | United Kingdom . |

*Primary Examiner*—Edward J. Smith
*Attorney, Agent, or Firm*—Pennie & Edmonds

[57] ABSTRACT

A process for low temperature polymerization and copolymerization of alpha-olefins comprising conducting the polymerization in the presence of a catalytic system comprising an organic compound of a metal of Group IA, IIA, IIB, IIIA and IVA of the Periodic Table and a solid catalytic complex which is prepared by reacting a compound of a metal of Groups IVB, VB and VIB of the Periodic Table with a porous aluminum oxide on which a magnesium compound is deposited.

12 Claims, 2 Drawing Figures

PROCESS FOR THE POLYMERIZATION OF OLEFINS

This is a continuation, of application Ser. No. 414,997, filed Nov. 12, 1973, now abandoned.

BACKGROUND OF THE INVENTION

The present invention relates to an improved process for the low pressure polymerization of olefins.

For the low pressure polymerization of olefins, it is known to use catalyst systems comprising a transition metal compound and an organometallic compound.

It is also known to attach the transition metal compound to oxygen-containing supports which have large pore volume, such as aluminas as described in Belgian Pat. No. 768,271 and halogen-containing aluminas as described in Belgian Pat. No. 773,227.

The catalyst systems thus produced are very active when compared with those wherein the transition metal compound is used directly. They lead to polymers which are characterized by a wide distribution of molecular weights and which are free from long chain branches, which renders them particularly suitable for use in extrusion-blowing.

However, these catalyst systems of the prior art possess a great disadvantage. In effect, they are most generally used in olefin polymerization processes carried out in the presence of a molecular weight regulator which is almost exclusively hydrogen. It has been recently found that these systems also catalyze the hydrogenation of olefins. A significant part of the olefin to be polymerized is thus converted into the corresponding saturated hydrocarbon, which is detrimental to the economics of the process. Furthermore, these catalyst systems produce polymers of very high average molecular weight. In order to decrease this average molecular weight, it is consequently necessary to increase the hydrogen concentration in the polymerization medium and/or to carry out the polymerization at a higher temperature. The unfortunate consequence of both these measures is to further increase the degree of hydrogenation of the olefin being polymerized.

Applicant has now discovered that the use of a new improved type of catalyst complex makes it possible to avoid the disadvantages connected with the use of the catalyst systems of the prior art, and in particular hydrogenation, while making it possible to produce, with an activity which is further improved, olefin polymers with a wide distribution of molecular weight of which is controlled more easily.

SUMMARY OF THE INVENTION

The present invention thus relates to a process for the low pressure polymerization of alpha-olefins in which the process is carried out in the presence of a catalyst system comprising an organometallic compound of a metal from groups IA, IIA, IIB, IIIA, and IVA of the Periodic Table and a solid catalyst complex prepared by reacting a compound of a metal from groups IVB, VB and VIB of the Periodic Table with a porous aluminum oxide on which there is deposited a magnesium compound chosen from amongst oxygen-containing compounds and halogen-containing compounds.

DETAILED DESCRIPTION OF THE INVENTION

Figure 1:
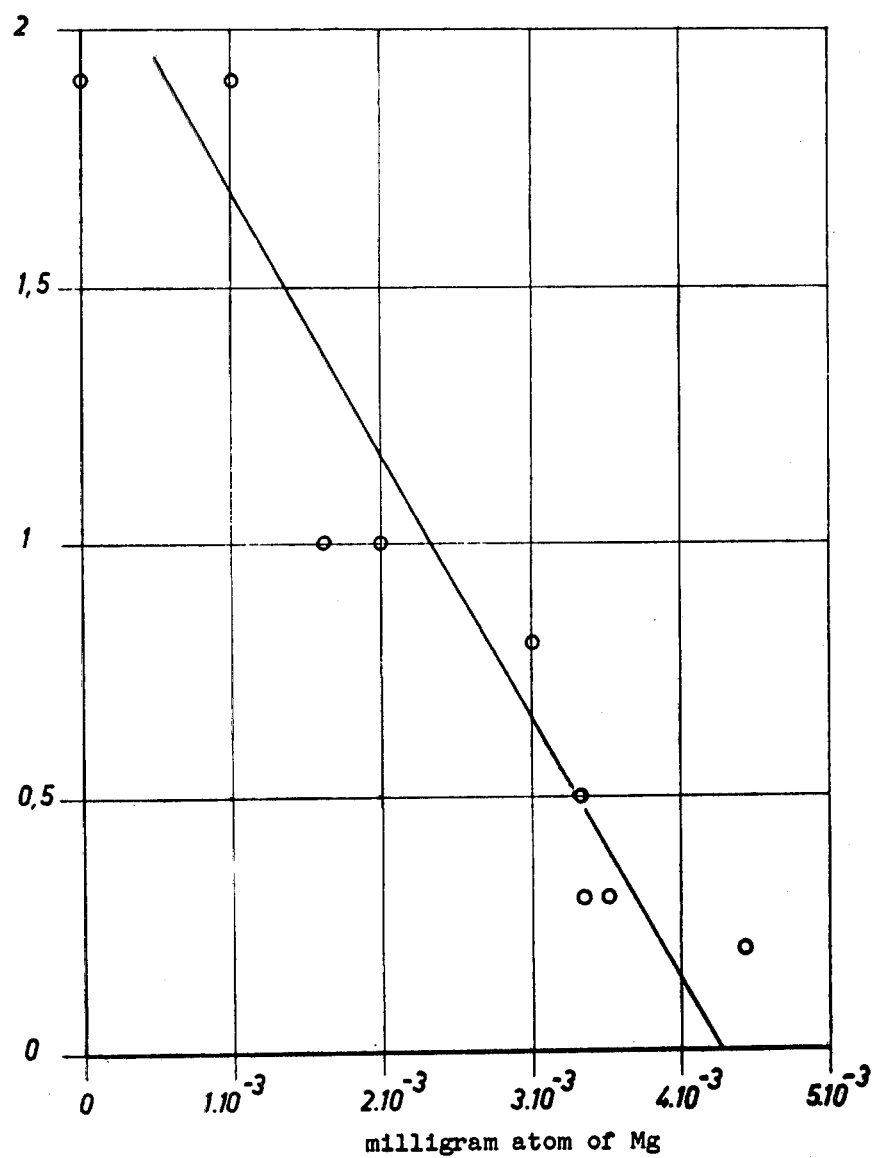

The solid catalyst complexes used in the present invention are prepared from a porous aluminum, oxide on which a magnesium compound is deposited.

By porous oxide, there is to be understood any oxide whatsoever which has a large internal porosity, that is to say in which the volume of the pores represents a large proportion of the volume of the particles. The internal porosity is generally characterized by the ratio of the volume of the pores to the weight of material. The internal porosity of the oxides which can be used according to the present invention, measured in accordance with the technique known by the name of BET technique, described by S. Brunauer, P. Emmett and E. Teller in J. Am. Chem. Soc., 60, p. 309–319 (1938), is greater than 0.3 $cm^3/g$ and preferably greater than 0.7 $cm^3/g$. Excellent results are obtained with porous oxides, the internal porosity of which is greater than 1 $cm^3/g$.

The porous oxides used within the scope of the present invention generally have a specific surface area greater than 100 $m^2/g$, and most frequently of the order of 200 to 400 $m^2/g$. These specific surface areas are measured in accordance with the technique described by S. Brunauer, P. Emmett and E. Teller in the article mentioned above, using the standardized method described in British Standards BS 4359, part 1 (1969).

The particle size of the porous oxides used has no effect on the yield of the catalyst. For convenience, however, it is preferred to use particles, the average diameter of which is between 1 and 500 microns, and preferably between 40 and 200 microns. Moreover, the morphology of the polymer and its free-flowing characteristics are improved if porous oxides in the form of particles of uniform shape and showing a narrow distribution of particle size are used. Excellent results are obtained with porous oxides, the average diameter of the particles of which is approximately 100 microns, and the distribution of the diameters of which is narrow.

The exact chemical structure and the method of preparation of the porous oxides used according to the present invention are not critical, provided that they contain aluminum bonded to oxygen in their molecule. These porous oxides are chosen from amongst simple aluminas and complex oxides of aluminum and at least one other metal.

The aluminas can be prepared in accordance with any known methods, for example:

by high temperature pyrolysis of alumina hydrates, aluminum hydroxides or aluminum salts; or by precipitation of soluble aluminum salts, dissolved in water, such as the nitrate and the chloride, in the presence of an alkaline compound such as ammonia, and pyrolysis of the gel thus produced.

Aluminas which are very particularly suitable for carrying out the present invention are activated aluminas, prepared by high temperature pyrolysis of alumina hydrates, described in Belgian Pat. No. 768,271. Excellent results are obtained with activated aluminas of internal porosity greater than 1 $cm^3/g$, manufactured from the α-monohydrate by heating at 700°–800° C. for 4 to 24 hours.

The complex oxides used according to the invention are natural or synthetic complex oxides of aluminum and one or more other metals which are generally chosen from amongst the metals of groups IA, IB, IIA, IIB, IIIA, IVB, IVA, VB, VA, VIB, VIIB, and VIII of the Periodic Table, and preferably from amongst lithium sodium, potassium, magnesium, calcium, barium, zinc, manganese, strontium, iron, nickel, cobalt, tin and silicon. The following way be mentioned in particular:

aluminium silicates such as, for example, sillimanite $Al_2O_3.SiO_2$ and mullite $3Al_2O_3.2SiO_3$;

lithium, potassium and sodium aluminates and silico-aluminates, such as, for example, eukriptite $Li_2O.Al_2O_3.2SiO_2$, nephelite $Na_2O.Al_2O_3.2SiO_2$ and leucite $K_2O.Al_2O_3.4SiO_2$;

magnesium and calcium aluminates and silico-aluminates such as, for example, spinel $MgO.Al_2O_3$ and anorthite $CaO.Al_2O_3.2SiO_2$; and strontium, barium and zinc aluminates and silico-aluminates such as, for example, automolite $ZnO.Al_2O_3$.

The synthetic complex oxides can be prepared by known methods. For example, the so-called co-precipitation technique has always given satisfactory results. It consists of dissolving in water soluble salts of aluminum and other metals in amounts such that the desired ratio for the complex oxide is produced in the solution. Nitrates, chlorides and acetates are usually employed as soluble salts. Thereafter, an alkaline substance such as ammonia or sodium bicarbonate in aqueous solution is added gradually to the solution. This brings about the formation of a solid precipitate which, after pyrolysis, finally gives the complex oxides which can be used according to the invention.

Complex oxides which are very suitable for carrying out the present invention are those in which the amount of aluminum is such that the ratio between this amount and the total amount of the other metals present, expressed in gram atom/gram atom, is generally between 0.1 and 10 and preferably between 0.25 and 5. Excellent results are obtained with complex oxides of aluminum and magnesium, of internal porosity greater than 1 $cm^3/g$, in which the ratio defined above has a value of approximately 2, and which correspond to the general formula $MgO.Al_2O_3$.

All the porous oxides described above can advantageously be subjected to a halogenation treatment prior to the deposition of the halogen-containing magnesium compound under the conditions described in detail in Belgian Pat. No. 773,227. This halogenation treatment improves the yield of the catalysts prepared from the porous oxides of the invention. It consists of subjecting the porous aluminum oxides to the action of a halogenating agent. The latter is preferably a fluorinating agent. It is preferably chosen to be a solid which can be decomposed into volatile products without a solid residue, such as, for example, ammonium fluoride. This treatment must be carried out in such a way such that the halogen-containing aluminas or complex aluminum oxides produced possess an atomic ratio of halogen to aluminum between 0.01 and 1. The best results are obtained when this ratio is between 0.06 and 0.30, and more particularly between 0.10 and 0.15.

The porous aluminium oxides can advantageously be subjected to a heat treatment prior to their being brought into contact with the magnesium compound, particularly when their preparation is not finished off by pyrolysis. This treatment is carried out at a temperature of between 100° and 1,000° C., and preferably between 300° and 800° C. In the case of porous oxides which have been subjected to a halogenation treatment, this heat treatment can be combined with the halogenation treatment or can follow it. It is then carried out under conditions such that porous oxides are produced which possess the atomic ratio of halogen to aluminium defined above. The pressure under which this treatment is carried out and the atmosphere in which it is carried out are not critical. For convenience, it is preferred to work under atmospheric pressuure in an inert atmosphere. The duration of the heat treatment is not critical and is generally between 1 and 24 hours.

According to the present invention, the porous aluminium oxides described above must be treated with a magnesium compound in such a way as to produce a deposit of this compound on the surface of the porous oxide.

By magnesium compound, there are to be understood any oxygen-containing compounds and any halogen-containing compounds of this metal, that is to say any compounds of this metal containing at least one magnesium-oxygen bond or at least one magnesium-halogen bond in their molecule.

A first class of magnesium compounds suitable for the realisation of the invention consists of magnesium compounds containing at least one magnesium-oxygen bond.

They can be inorganic oxygen-containing compounds of magnesium, in the molecule of which the magnesium is bonded only to oxygen. Amongst the latter, the following may be mentioned:

the hydroxide $Mg(OH)_2$, salts of inorganic oxygen-acids such as, for example, $MgCO_3$, $MgSO_4$, $Mg(NO_3)_2$, $Mg_2(PO_4)_3$, $Mg_3(BO_3)_2$ and $Mg(ClO_4)_2$, optionally hydrated basic salts of magnesium such as, for example $4\ MgCO_3.Mg(OH)_2.5H_2O$ and $3MgCO_3.Mg(OH)_2.3H_2O$, and optionally hydrated basic salts of magnesium and another metal such as, for example, $Mg_6Al_2(OH)_{16}CO_3.4H_2O$.

They can also be organic oxygen-containing compounds of magnesium, that is to say compounds containing any organic radicals bonded to magnesium via oxygen.

The organic radicals bonded to magnesium via oxygen can be any whatsoever.

They are preferably chosen from amongst radicals containing 1 to 20 carbon atoms, and more particularly from amongst those containing 1 to 6 carbon atoms. These radicals can be saturated or unsaturated, with branched, straight or cyclic chains; they can also be substituted and/or contain hetero-atoms such as O, S, N, P and the like in their chain. They are preferably chosen from amongst hydrocarbon radicals and particularly from amongst alkyl, alkenyl, aryl, cycloalkyl, aralkyl, alkylaryl and acyl radicals and their substituted derivatives.

Amongst these compounds, the following may be mentioned:

magnesium alkoxides such as, for example, the methylate, ethylate, isopropylate, decanolate, cyclohexanolate and benzylate, magnesium phenoxides such as, for example, the phenate, naphthenate, anthracenate, phenantrenate and cresolate, optionally hydrated magnesium carboxylates such as, for example, the acetate, stearate, benzoate, phenylacetate, adipate, sebacate, phthalate, acrylate and oleate, organic oxygen-containing and nitrogen-containing compounds of magnesium, that is to say compounds comprising magnesium-oxygen-nitrogen-organic radical bond sequences, such as oximates, and particularly the butyloximate, dimethylglyoximate and cyclohexyloximate, salts of hydroxamic acids and salts of hydroxylamines and particularly the derivative of N-nitroso-N-phenylhydroxylamine, and magnesium chelates, that is to say organic oxygen-containing compounds in which the magnesium possesses at least one sequence of normal bonds of the magnesium-oxygen-organic radical type and at least one coordination bond in such a way as to form a heterocyclic structure in which the magnesium is enclosed, such as enolates and in particular the acetylacetonate, as well as the complexes obtained from phenolic derivatives possessing an electron donor group in the ortho-position relative to the hydroxide group, and particularly the 8-hydroxyquinolinate.

Of course, the following compounds are also included in this series of organic oxygen-containing compounds:

compounds containing several different organic radicals such as, for example, magnesium methoxyethylate, alkoxide and phenoxide complexes of magnesium and another metal such as, for example, $Mg[Al(OR)_4]_2$ and $Mg_3[Al(OR)_6]_2$ and mixtures of two or more of the organic oxygen-containing compounds of magnesium defined above.

The oxygen-containing compounds of magnesium finally comprise the complex compounds containing several types of radicals bonded to magnesium via oxygen.

For example, the oxygen-containing compounds of magnesium can simultaneously contain organic and inorganic oxygen-containing radicals; they can also contain organic radicals bonded directly to the magnesium via carbon. Amongst these compounds, there may be mentioned, for example, magnesium hydroxymethylate and magnesium ethylethylate.

Amongst all the oxygen-containing compounds of magnesium mentioned above, it is preferred to use the organic oxygen-containing compounds of this metal, and particularly those which contain only magnesium-oxygen-organic radical bond sequences. Amongst the latter, the best results are obtained with alkoxides and phenoxides of this metal.

A second class of magnesium compounds suitable for the realisation of the invention consists of magnesium compounds containing at least one magnesium-halogen bond. The halogen bonded to the magnesium can be fluorine, chlorine, bromine or iodine. This halogen is preferably chlorine. Amongst these compounds, the following may be mentioned:

magnesium dihalides of the commercial type which are conventionally called "anhydrous" and which are, in fact, hydrated dihalides containing one molecule and less of water per molecule of dihalide, "commercial anhydrous" magnesium dichlorides are a typical example of these compounds;

magnesium dihalides complexed by means of various electron donors such as, for example, complexes with ammonia such as $MgCl_2.6NH_3$ and $MgCl_2.2NH_3$ and complexes with alcohols such as $MgCl_2.6CH_3OH$, $MgCl_2.6C_2H_5OH$ and $MgCl_2.6C_3H_7OH$; and hydrated magnesium dihalides containing more than one molecule of water per molecule of dihalide such as, for example, $MgCl_2.6H_2O$, $MgCl_2.4H_2O$ and $MgCl_2.2H_2O$.

Amongst the magnesium compounds belonging to this second class, the dihalides are those which are preferred for the realisation of the invention, the best results being achieved with hydrated magnesium dichlorides. The use of two or more different compounds amongst the compounds defined above also falls within the scope of the invention.

A third and final class of magnesium compounds suitable for the realisation of the invention consists of the compounds of this metal which simultaneously contain magnesium-halogen bonds and magnesium-oxygen bonds in their molecule. By way of examples of these compounds, the following may be mentioned:

compounds containing, in addition to the magnesium-halogen bond (preferably the magnesium-chlorine bond), an inorganic radical bonded to the magnesium via oxygen, such as a hydroxyl radical, as in, for example, $Mg(OH)Cl$ and $Mg(OH)Br$, compounds containing, in addition to the magnesium-halogen bond (preferably the magnesium-chloride bond), any organic radical whatsoever bonded to the magnesium via oxygen. This organic radical is preferably chosen from amongst the radicals defined above, the best results being obtained with magnesium chloroalkoxides and chlorophenoxides such as, for example, $Mg(OCH_3)Cl$, $Mg(OC_2H_5)Cl$ and $Mg(OC_6H_5)Cl$, the products from the hydrolysis of hydrated magnesium halides (preferably chlorides) insofar as these products also contain magnesium-halogen bonds, and mixed compositions comprising halogen-containing and oxygen-containing compounds of magnesium. Typical examples of these compositions are basic magnesium halides (preferably chlorides) such as $MgCl_2.MgO.H_2O$, $MgCl_2.3MgO.7H_2O$ and $MgBr_2.3MgO.6H_2O$.

Finally, it is to be understood that the use of two or more compounds belonging to one of the three classes defined above also falls within the scope of the present invention.

The amount of magnesium compound which it is necessary to deposit on the porous aluminium oxide is an essential characteristic of the invention. Expressed by weight of magnesium relative to the surface area of the porous oxide, it must be between $10^{-4}$ and $10^{-1}$ milligram atom (mg-atom) of this metal per $m^2$ of specific surface area (BET) of the porous oxide. It is preferably between $1 \times 10^{-3}$ and $5 \times 10^{-3}$ mg-atom of $Mg/m^2$ of specific surface area.

The results are optimum within the ranges defined above. However, it has been observed that the optimum amount of magnesium compound varies slightly as a function of the nature of the compound.

Thus the best results are obtained with porous oxides possessing a specific surface area of between 200 and 400 $m^2/g$ on which there has been deposited:

$1 \times 10^{-3}$ to $2.5 \times 10^{-3}$ mg-atom of $Mg/m^2$ of specific surface area, starting from an organic oxygen-containing compound of magnesium which contains only magnesium-oxygen-organic radical bond sequences in its molecule, and $2 \times 10^{-3}$ to $4 \times 10^{-3}$ mg-atom of $Mg/m^2$ of specific surface area, starting from a magnesium compound containing at least one magnesium-halogen bond and no magnesium-oxygen bonds in its molecule.

The magnesium compound can be deposited at the surface of the porous aluminium oxide in accordance with any known method whatsoever. In particular, the necessary amount of magnesium compound can be deposited on the porous oxide:

in the form of solids, for example, as a suspension in an inert diluent;

in the form of a vapour or gas; or in a liquid medium, either in the form of a solution of water or of an organic diluent which is capable of dissolving the magnesium compound, or in the presence of an organic oxygen-containing compound (M) as defined below.

The temperature at which the magnesium compound is deposited on the porous aluminium oxide is not critical. It is preferred to work at a temperature below the decomposition temperature of the magnesium compound. In the case where the latter is employed in the form of a solution, the process is most generally carried out in the vicinity of the temperature corresponding to maximum solubility of the magnesium compound. The pressure is not critical either; the process is generally carried out at about atmospheric pressure.

It is preferred to employ the magnesium compound in a liquid medium. It has been observed that, surprisingly, when the deposition of the magnesium compound on the porous oxide is carried out in accordance with this method, there is always a portion of this compound which remains chemically attached in an irreversible manner to the porous aluminium oxide. This attachment is practically quantitative when the amount of magnesium compound employed, expressed by weight of this metal, is less than $5 \times 10^{-3}$ mg-atom of Mg/m$^2$ of specific surface area of the porous oxide.

The use of the magnesium compound in a liquid medium can be effected in accordance with several particular methods which will be described in detail below.

A first procedure consists of using the magnesium compound in the form of a solution in a solvent which is water or an organic diluent which is capable of dissolving the magnesium compound. Any diluents usually employed in organic chemistry can be used. It is however preferred to use alkanes and cycloalkanes, the molecule of which contains 4 to 20 carbon atoms, such as isobutane, normal pentane, pentamethylpentane, normal hexane, normal heptane, cyclohexane, methylcyclohexane and dodecanes. It is also possible to use alcohols, the molecule of which contains 1 to 12 carbobn atoms per hydroxyl group, such as methanol, ethanol, butanol, decanol and cyclohexanol, as well as mixtures of the abovementioned alcohols, alkanes and cycloalkanes.

It is also possible to use solvents which have a high complexing power such as, for example, tetrahydrofurane. In the case of magnesium dihalides, it is preferred to use them in the form of aqueous solutions.

A particularly simple way of carrying out the deposition of the magnesium compound on the porous aluminium oxide in accordance with this procedure consists of treating the oxide with a volume of solution such that the mixture retains a pulverulent character, this volume containing an amount of magnesium compound at least equal to the amount which can be chemically attached to the oxide, and of maintaining contact, preferably at ambient temperature and with stirring, for a period which generally varies approximately between 1 minute and 1 hour. It is possible to remove any excess which may be present by means of the solvent for the magnesium compound. The latter solvent is preferaby chosen to be identical to that which was used for carrying out the impregnation of the porous aluminium oxide.

After depositing the magnesium compound on the porous aluminium oxide in accordance with this procedure, the solid thus obtained is generally subjected to an activation treatment, which makes it possible easily to remove the solvent. This activation treatment is generally absolutely necessary when the solvent used is water. It is preferably carried out at a temperature below the decomposition temperature of the magnesium compound, but this condition is in no way essential, and decomposition of the magnesium compound does not have a detrimental effect on the properties of the catalyst, provided that the magnesium content of the porous oxide remains within the limits defined above. The other working conditions of the activation treatment are chosen as a function of the nature of the solvent used and are generally the same as those at which the heat treatment mentioned above is carried out.

In the case of certain magnesium compounds which are insoluble in water or in one of the organic diluents mentioned above, it is still possible to employ them in a liquid medium in accordance with a second procedure, by mixing them with an organic oxygen-containing compound (M) of a metal from groups IA, IIB, IIIA, IVB, IVA, Vb, VIB, VIIB, and VIII of the Periodic Table optionally in the presence of a diluent. By this definition of an organic oxygen-containing compound (M), there are to be understood any compounds wherein an organic radical is bonded to the metal via oxygen. Compounds comprising, in addition, metal-oxygen bonds and condensed compounds comprising metal-oxygen-metal bond sequences, can also be used provided that they also contain at least one metal-oxygen-organic radical bond sequence per molecule.

The organic radicals bonded to the metal via oxygen can be any whatsoever. They are preferably chosen from amongst the same radicals as those present in the composition of the organic oxygen-containing compounds of magnesium, and preferably from amongst hydrocarbon radicals and in particular from amongst (linear or branched) alkyl, cycloalkyl, aralkyl, aryl and alkylaryl radicals.

Amongst the metals from the groups referred to above, lithium, sodium, potassium, zinc, boron, aluminium, silicon, tin, titanium, zirconium, vanadium, chromium, manganese, iron, cobalt and nickel may be mentioned by way of examples. It is however preferred to use organic oxygen-containing compounds of aluminium, silicon, titanium, zirconium, vanadium and chromium. The best results are obtained with organic oxygen-containing compounds of titanium.

These organic oxygen-containing compounds (M) can be represented by the general formula $[MeO_x(OR)_y]_m$ wherein (Me) is a metal from the groups mentioned above, wherein R is an organic radical as defined above, wherein x and y are any numbers such that $x \geq 0$ and $y > 0$ compatible with the valency of the metal (Me) and wherein m is an integer. It is preferred to use organic oxygen-containing compounds (M) wherein x is such that $0 \leq x \leq 1$ and m is such that $1 \leq m \leq 6$. Amongst the organic oxygen-containing compounds (M) intended to be brought into contact with the magnesium compound, the following may be mentioned:

Alkoxides such as Li(O-iso-C$_3$H$_7$), Al(O-iso-C$_3$H$_7$)$_3$, B(O-iso-C$_3$H$_7$)$_3$, Si(OC$_2$H$_5$)$_4$, Ti(O-iso-C$_3$H$_7$)$_4$, Ti(O-iso-C$_4$H$_9$)$_4$, V(O-iso-C$_3$H$_7$)$_4$ and Zr(O-iso-C$_3$H$_7$)$_4$, phenoxides such as Ti(OC$_6$H$_5$)$_4$, oxyalkoxides such as $VO(O\text{-iso-}C_3H_7)_3$, condensed alkoxides such as $Ti_2O(O\text{-iso-}C_3H_7)_6$ and enolates such as titanium acetylacetonate.

The use of organic oxygen-containing compounds (M) comprising several different organic radicals also falls within the scope of the present invention. The same applies to the use of several different organic oxygen-containing compounds of one and the same metal and to the use of several organic oxygen-containing compounds of different metals.

The working conditions for the mixture of the magnesium compound and the organic oxygen-containing compound (M) must be chosen as a function of the physical state of each of these compounds, so as to form a liquid mixture or a solution in which the concentration of magnesium is sufficient to ensure that the necessary amount of magnesium is deposited on the surface of the porous aluminium oxide. When the process is carried out in the absence of a diluent, the temperature and pressure conditions are chosen so that at least one of the compounds, and preferably the organic oxygen-containing compound (M), is liquid. It often happens that this compound, kept in the liquid state, is capable of dissolving the magnesium compound. It is also possible to use a second organic oxygen-containing compound (M) which is liquid and capable of dissolving the magnesium compound.

It can happen, however, that the organic oxygen-containing compound (M) decomposes on heating, that the mixture of this compound and the magnesium compound becomes solid again on cooling or that it is not possible to employ either of the compounds in the liquid state. In this case, it is still possible to carry out the deposition of the magnesium compound on the porous oxide in a liquid medium, by making use of a diluent, which is preferably chosen from amongst the organic diluents mentioned above and is capable of dissolving at least partially the organic oxygen-containing compound (M) or the product after mixing it with the magnesium compound.

The use of such a diluent for this purpose constitutes the preferred variant for employing the magnesium compound according to this second procedure. It should be noted that this second procedure, and particularly the variant described above, is generally applicable to the majority of the magnesium compounds which are soluble in water, and particularly to the dihalides of this metal. It possesses the great advantage, in this case, of dispensing with the activation step mentioned in the description of the first procedure.

When the magnesium compound is deposited on the surface of the porous aluminium oxide in accordance with this second procedure, the amount of organic oxygen-containing compound (M), whether liquid or dissolved in the diluent, must be sufficient to ensure at least the dissolution of the necessary amount of magnesium compound. In general, the respective amounts of these compounds to be employed are such that the atomic ratio of the metal (Me) of the organic oxygen-containing compound to magnesium varies between 0.5 and 100 gram atom/gram atom, and preferably between 0.5 and 2 gram atom/gram atom.

When the variant of this second procedure, consisting of adding a diluent to the organic oxygen-containing compound (M) or to the mixture of this compound with the magnesium compound, is used, it is preferable for the total concentration of the dissolved compound or compounds to be greater than 5% by weight, and preferably greater than 20% by weight, relative to the diluent. The other conditions for the preparation of the solution or of the liquid mixture are not critical. For convenience, it is preferred to work between 20° and 300° C., and preferably between 50° and 200° C., and at about atmospheric pressure. The liquid mixture or the solution can be rendered homogeneous by stirring.

A very simple way of carrying out the deposition of the magnesium compound on the porous aluminium oxide in accordance with this second procedure consists, firstly, of preparing a solution, in the diluent, of the mixture of the magnesium compound and the organic oxygen-containing compound (M) and of treating the porous oxide with a particular volume of this solution, in accordance with the method mentioned in the description of the first procedure. It is also possible to suspend the porous oxide in the said solution, to maintain contact between the oxide and the solution under the abovementioned conditions, to remove the excess solution, for example by filtration or decanting, and to recover the solid thus obtained which is used directly during the remainder of the preparation of the catalyst complexes of the invention.

Since one of the essential characteristics of the porous aluminium oxides used for the preparation of the catalyst complexes according to the invention residues in their surface content of magnesium, there is no need to take account of the chemical reactions, the mechanism of which, furthermore, is not very clear, which can take place between the magnesium compound and the organic oxygen-containing compound (M), during the preparation of the fused mixture or of the solution by means of which the deposition of the magnesium compound on the porous oxide is carried out.

The last step in the preparation of the solid catalyst complexes of the invention consists of reacting the porous aluminium oxide on which the magnesium compound is deposited (hereafter called "solid") with a compound of a metal from groups IVA, VB, or VIB of the Periodic Table (hereafter called "transition metal"). The latter compound is preferably chosen from amongst titanium, zirconium, vanadium and chromium compounds. When the solid has been prepared by employing an organic oxygen-containing compound (M), the metal (Me) of which belongs to one of the groups IVA, VB, or VIB, a transition metal compound is preferably chosen in which the metal is identical to the metal (Me). The best results are obtained with titanium compounds.

As compounds, it is possible to use halides, oxyhalides, alkoxyhalides, oxyalkoxides and alkoxides. When halogen-containing compounds are employed, it is preferred to use brominated and chlorinated compounds such as $TiCl_4$, $TiBr_4$, $VCl_4$, $VOCl_3$, $VOBr_3$, $CrO_2Cl_2$, $Ti(OC_2H_5)_3Cl$, $Ti(O\text{-iso-}C_3H_7)_3Cl$, $Ti(OC_2H_5)_2Cl_2$, $Ti(O\text{-iso-}C_3H_7)Cl_3$ and $ZrOCl_2$. When compounds containing alkoxy radicals are employed, they are preferably chosen from amongst those in which the linear or branched alkoxy radicals each contain 1 to 20 carbon atoms, and more particularly each contain 1 to 10 carbon atoms, such as $Ti(O\text{-iso-}C_4H_9)_4$, $Ti(O\text{-iso-}C_3H_7)_3Cl$ and $VO(O\text{-iso-}C_3H_7)_3$. It is also possible to use condensed alkoxides such as $Ti_2O(O\text{-iso-}C_3H_7)_6$.

When the magnesium compound used for the preparation of the solid belongs to the class of compounds of this metal containing at least one magnesium-oxygen bond and not containing any magnesium-halogen bonds in their molecule, it is preferred to use halogen-containing compounds of transition metals. In every case, the best results are obtained with TiCl$_4$. The use of several different transition metal compounds also falls within the scope of the present invention.

The transition metal compound is preferably chosen in such a way as to be employed in the form of a vapour or in the form of a gas optionally diluted with an inert gas, in the form of a liquid or in the form of a solution. As the solvent, the diluents usually employed in the low pressure polymerisation of olefins are generally used. It is however preferred to bring the solid directly into contact with a large amount of the pure transition metal compound kept in the liquid state, for example, by simply suspending it. It is also possible to carry out the reaction by washing the solid with the transition metal compound when the latter is liquid under the conditions of the reaction or to bring the solid into contact with successive fresh charges of the transition metal compound in a continuous extractor of the Soxhlet or Kumayawa type. This last technique is generally recommended when the solid has been prepared in accordance with the preferred variant of the second procedure described above.

The temperature at which the reaction is carried out is not critical. The reaction is generally carried out between 0° and 300° C. When the reaction is carried out at atmospheric pressure, the temperature is chosen between ambient temperature and the normal boiling point of the transition metal compound. The reaction is then preferably carried out between 20° and 140° C.

Contact with the transition metal compound is maintained for a sufficient period for chemical attachment of the transition metal compound to the solid to take place. In general, this attachment is achieved after 30 minutes to 1 hour.

After the reaction, the catalyst complex produced can be washed with the same transition metal compound as that used for the reaction. It is then generally washed with an inert hydrocarbon solvent such as, for example, isobutane, normal pentane, normal hexane, cyclohexane and dodecanes, so as to remove the excess transition metal compound which is not chemically attached to the support. When an elementary analysis of the catalyst complex thus treated is carried out, the value for the transition metal content is generally greater than 10 g/kg and most frequently greater than 15 g/kg and the value for the magnesium content is equal to or slightly less than the magnesium content of the solid used for the preparation of the catalyst complex.

The catalyst systems according to the present invention also comprises an organic compound of a metal from groups IA, IIA, IIB, IIIA, and IVA, of the Periodic Table, such as organic compounds of lithium, magnesium, zinc, aluminium or tin. The best results are obtained with organic aluminium compounds.

It is possible to use completely alkyl compounds, the alkyl chains of which contain 1 to 20 carbon atoms and are straight or branched, such as, for example, n-butyllithium, diethyl-magnesium, diethyl-zinc, trimethyl-aluminium, triethyl-aluminium, tri-isobutyl-aluminium, tri-n-butyl-aluminium, tri-n-decyl-aluminium, tetraethyl-tin and tetrabutyl-tin. It is however preferred to use trialkyl-aluminiums, the alkyl chains of which contain 1 to 10 carbon atoms and are straight or branched.

It is also possible to use alkyl-metal hydrides in which the alkyl radicals also contain 1 to 20 carbon atoms, such as di-isobutyl-aluminium hydride and trimethyl-tin hydride. Alkyl-metal halides in which the alkyl radicals also contain 1 to 20 carbon atoms are also suitable, such as ethyl-aluminium sesquichloride, diethyl-aluminium chloride and di-isobutyl-aluminium chloride.

Finally, it is also possible to use organo-aluminium compounds produced by reacting trialkyl-aluminiums or dialkyl-aluminium hydrides in which the radicals contain 1 to 20 carbon atoms with diolefines containing 4 to 20 carbon atoms, and more particularly the compounds called isoprenyl-aluminiums.

The process of the invention can be applied to the polymerisation of olefines possessing a terminal unsaturated bond, the molecule of which contains 2 to 20 and preferably 2 to 6 carbon atoms, such as ethylene, propylene, but-1-ene, 4-methyl-pent-1-ene and hex-1-ene. It can also be applied to the copolymerisation of these olefines with one another as well as with diolefines preferably containing 4 to 20 carbon atoms. These diolefines can be unconjugated aliphatic diolefines such as hexa-1,4-diene, monocyclic diloefines such as 4-vinyl-cyclohexene, 1,3-divinyl-cyclohexane, cyclopenta-1,3-diene or cycloocta-1,5-diene, alicyclic diolefines with an endocyclic bridge such as dicyclopentadiene or norbornadiene and conjugated aliphatic diolefines such as butadiene and isoprene.

The process of the invention can be applied very particularly to the manufacture of ethylene homopolymers and copolymers containing at least 90 mol% and preferably 95 mol% of ethylene.

The polymerisation can be carried out in accordance with any known process whatsoever, such as in solution or in suspension in a solvent or a hydrocarbon diluent or in the gas phase. In the case of the processes carried out in solution or suspension, solvents or diluents similar to those employed for washing the catalyst complex are used. They are preferably alkanes or cycloalkanes such as butane, pentane, hexane, heptane, cyclohexane, methylcyclohexane or their mixtures. It is also possible to carry out the polymerisation in the monomer or one of the monomers kept in the liquid state.

The polymerisation pressure is generally between atmospheric pressure and 100 kg/cm$^2$, and preferably 50 kg/cm$^2$. The temperature is generally chosen between 20° and 200° C., and preferably between 60° and 120° C. The polymerisation can be carried out continuously or discontinuously.

The organic compound and the catalyst complex can be added separately to the polymerisation medium. They can also be brought into contact, at a temperature of between −40° and 80° C., for a period which can be as long as 2 hours, before introducing them into the polymerisation reactor. It is also possible to bring them into contact in several stages or to add a portion of the organic compound before the reactor or to add several different organometallic compounds.

The total amount of organic compound employed is not critical; it is generally between 0.02 and 50 mmols per dm$^3$ of solvent, diluent or reactor volume, and preferably between 0.2 and 5 mmols/dm$^3$.

The amount of catalyst complex employed is decided as a function of the content of transition metal in the complex. It is generally chosen in such a way that the concentration is between 0.001 and 2.5, and preferably between 0.01 and 0.25 mg-atom of metal per dm$^3$ of solvent, diluent or reactor volume.

The ratio of the amounts of organic compound and catalyst complex is not critical either. It is generally chosen in such a way that the ratio of organic compound to transition metal, expressed in mol/gram atom, is greater than 1 and preferably greater than 10.

The average molecular weight, and consequently the melt index, of the polymers manufactured according to the process of the invention can be controlled by adding one or more molecular weight regulators, such as hydrogen, diethyl-zinc or diethyl-cadmium, alcohols or carbon dioxide, to the polymerisation medium.

The specific gravity of the homopolymers manufactured according to the process of the invention can also be controlled by adding an alkoxide of a metal from groups IVa and Va of the Periodic Table to the polymerisation medium. Thus it is possible to manufacture polyethylenes of specific gravity intermediate between that of the polyethylenes manufactured according to a high pressure process and that of conventional high density polyethylenes.

Amongst the alkoxides which are suitable for this control, those of titanium and vanadium in which each of the radicals contain 1 to 20 carbon atoms are particularly effective. Amongst them, $Ti(OCH_3)_4$, $Ti(OC_2H_5)_4$, $Ti[OCH_2CH(CH_3)_2]_4$, $Ti(OC_8H_{17})_4$ and $Ti(OC_{16}H_{33})_4$ may be mentioned.

The process of the invention makes it possible to manufacture polyolefines with yields similar to and most frequently greater than those obtained with the catalysts of the prior art in which the transition metal compound is attached to an activated alumina or a halogen-containing alumina. Thus, in the homopolymerisation of ethylene, the yield, expressed in grams of polyethylene per gram of catalyst complex, commonly exceeds 1,000 and can even exceed 2,000 in the case of catalyst complexes prepared from porous oxides which have been subjected to a prior fluorination treatment. Since, moreover, the content of transition metal in the catalyst complexes is very low, the concentration of catalyst residues, detrimental to the processing of the polymers, is negligible. Because of this, the polymers no longer require to be purified. The most delicated and the most expensive operation of the finishing of the polymers is thus eliminated.

Furthermore, the catalyst systems prepared according to the invention possess a series of very surprising properties.

First of all, they make it possible to manufacture polymers with melt indices, measured under normal load in accordance with ASTM Standard Specification D 1238-57 T, similar to those obtained with the catalysts of the prior art mentioned above, with much lower concentrations of molecular weight regulator. This property is particularly valuable when the regulator used is hydrogen, because the hydrogenation of the olefine to be polymerised is reduced, which obviously improves the yield of the process.

Secondly, they make it possible to manufacture polymers with a much higher $U_w$ factor than the polymers obtained in the presence of the catalysts of the prior art.

The $U_w$ factor is calculated from the formula $$U_w = \frac{\overline{M}_z}{\overline{M}_w} - 1$$

in which:

$\overline{M}_w$ is the weight average molecular weight defined by the ratio $$\overline{M}_w = \frac{\Sigma N_i M_i^2}{\Sigma N_i M_i}$$

wherein $N_i$ represents the number of molecules of molecular weight $M_i$, and $\overline{M}_z$ is the average molecular weight "z" defined by the ratio $$\overline{M}_z = \frac{\Sigma N_i M_i^3}{\Sigma N_i M_i^2}$$

wherein $N_i$ and $M_i$ have the meaning given above.

The ratio $M_z/M_w$ is determined from fractionation data by gel permeation chromatography of a solution of concentration 1 g/kg of the polymer in 1,2,4-trichlorobenzene at 130° C.

A high $U_w$ factor is representative of a wide distribution of molecular weights in the region of very high molecular weights.

It is thus possible, with the catalysts of the present invention, under particularly advantageous polymerisation conditions, to manufacture polymers with low melt indices and with very high $U_w$ factors, as defined above. The combination of these properties makes it possible to product polyolefins, the processing of which by extrusion-moulding and extrusion-blowing processes is remarkably easy. In particular, the moulded objects are free from surface defects and the phenomenon which is commonly called "melt fracture" does not manifest itself even at the highest rates of extrusion.

The examples which follow are given by way of illustration and do not imply any limitation as to the scope of the invention.

EXAMPLES 1 TO 17 AND COMPARATIVE EXAMPLES R9 AND R18

A. Preparation of the catalyst complexes

An alumina monohydrate of the α-type (boehmite) sold under the trademark "Ketjen Grade B" is kept at 700° C. for 5 hours under a nitrogen atmosphere. An activated alumina having a pore volume of 1.1 cm³/g and a specific surface area of 360 m²/g, is obtained.

Known quantities of this activated alumina are treated, at ambient temperature (25° C.), with known volumes of aqueous solutions of hydrated magnesium chloride, of increasing concentrations. The hydrated magnesium chloride used is a commercial product sold by Messrs. Rhone-Poulenc and corresponding to the formula $MgCl_2.4H_2O$. The treatment is carried out in such a way that the reaction mixture retains its pulverulent character. The solids obtained are thereafter kept at 250° C. for 16 hours under a nitrogen atmosphere. 5 g of each of the solids obtained are then suspended in 25 cm³ of $TiCl_4$ and the whole is heated to 120° C. for 30 minutes, with vigorous stirring. The solid reaction product is isolated and washed with hexane until there are no further chloride ions in the wash liquid. Thereafter, the product is dried under a stream of dry nitrogen. The particular conditions for each of these preparations, the analyses of each catalyst complex and the magnesium contents of each solid are shown in Table I below.

TABLE I

|  | Ex.1 | Ex.2 | Ex.3 | Ex.4 | Ex.5 | Ex.6 | Ex.7 | Ex.8 | Ex. R9 |
|---|---|---|---|---|---|---|---|---|---|
| Amount of activated alumina employed (g) | 14 | 13 | 14 | 12 | 12 | 20 | 20 | 25 | — |
| Volume of solution of $MgCl_2 \cdot 4H_2O$ used (ml) | 28 | 26 | 28 | 24 | 24 | 40 | 40 | 50 | — |
| Concentration of the solution of $MgCl_2 \cdot 4H_2O$ (g/l) | 36 | 54 | 72 | 90 | 108 | 126 | 144 | 180 | — |
| Amount of magnesium employed (g/kg of alumina) | 10 | 15 | 20 | 25 | 30 | 35 | 40 | 50 | — |
| Mg content of the solid obtained (mg.-atom/m$^2$)* | $1 \times 10^{-3}$ | $1.6 \times 10^{-3}$ | $2 \times 10^{-3}$ | $3 \times 10^{-3}$ | $3.3 \times 10^{-3}$ | $3.3 \times 10^{-3}$ | $3.5 \times 10^{-3}$ | $4.4 \times 10^{-3}$ | — |
| Ti content of the catalyst complex (mg/g) | 18 | 18 | 18 | 19 | 18 | 22 | 22 | 21 | 17 |
| Cl content of the catalyst complex (mg/g) | 80 | 89 | 96 | 101 | 111 | 123 | 130 | 149 | 78 |
| Mg content of the catalyst complex (mg/g) | 8.7 | 14 | 17 | 25 | 28 | 28 | 30 | 38 | — |

*Content expressed per m$^2$ of specific surface area of the alumina, before treatment at 250° C.

It is interesting to note that the fixing of the magnesium to the surface of the alumina is almost quantitative in relation to the amount of magnesium employed.

B. Polymerisation tests

Two series of polymerisation tests were carried out with the above catalyst complexes under the following conditions applicable to each case: a known quantity (see Tables II and III) of catalyst complex is suspended in 500 ml of hexane in a 1,500 ml stainless steel autoclave equipped with a paddle stirrer. 100 mg of triisobutyl-aluminium are introduced. The temperature is raised to 85° C. and ethylene and hydrogen are introduced under the partial pressures mentioned above. The polymerisation is continued for 1 hour whilst maintaining the ethylene pressure constant by continuous addition of ethylene. After releasing the gas from the autoclave, the amounts of polyethylene indicated in Tables II and III are collected.

The first series of polymerisation tests (Examples 1 to R9) was carried out under identical partial pressures of ethylene and hydrogen. The results of these tests are shown in Table II.

The second series of polymerisation tests (Examples 10 to R18) was carried out with the same series of catalyst complexes under varying pressures of ethylene and of hydrogen, choosing the ratio of these partial pressures to be within such limits that a polymer of melt index between about 0.15 and about 0.20 is obtained. The results of these tests are shown in Table III.

TABLE II (*)

| Catalyst complexes prepared according to the examples | 1 | 2 | 3 | 4 | 5 | 6 | 7 | 8 | R9 |
|---|---|---|---|---|---|---|---|---|---|
| Weight of catalyst complex employed (mg) | 150 | 125 | 125 | 100 | 75 | 50 | 41 | 37 | 75 |
| Weight of polyethylene (PE) collected (g) | 78 | 89 | 89 | 97 | 63 | 70 | 70 | 78 | 51 |
| Catalyst productivity (g of PE/g of catalyst complex) | 500 | 700 | 700 | 950 | 850 | 1,400 | 1,700 | 2,100 | 680 |
| Specific activity (g of PE/hr × g of Ti × kg/cm$^2$ of $C_2H_4$) | 2,900 | 3,900 | 3,900 | 5,100 | 4,600 | 6,400 | 7,700 | 10,000 | 3,990 |
| Melt index (MI) (g/10 min) (*) | () | () | () | 0.04 | 0.06 | 0.26 | 0.28 | 0.53 | (**) |
| Melt index under high load (HLMI) (g/10 min) (****) | 0.27 | 2.14 | 3.2 | 4.36 | 5.44 | 15.95 | 13.67 | 23.2 | 0.65 |
| Ratio of HLMI/MI | — | — | — | 109 | 91 | 61 | 49 | 44 | — |

(*) Partial pressures of ethylene (10 kg/cm$^2$) and of hydrogen (4 kg/cm$^2$) identical for all experiments.
(**) Not measurable.
(***) Measured under normal load (2.16 kg) according to ASTM Standard Specification 1238-57 T.
(****) Measured under high load (21.6 kg) according to ASTM Standard Specification 1238-57 T.

Table II shows clearly that under identical polymerisation conditions the specific activity and the catalyst productivity of the catalyst systems of the invention are higher than those of the catalysts of the prior art based on activated alumina (test R9, carried out with a catalyst complex prepared in the same manner as the catalyst complexes of Examples 1 to 8, but without treating the activated alumina with magnesium chloride) if the magnesium content of the solid exceeds $2 \times 10^3$ mg.-atom/m$^2$ of specific surface area. Furthermore, it is found that, keeping all the polymerisation conditions the same, the melt index of the polymers obtained increases proportionately with the magnesium content of the catalyst complexes.

TABLE III

| Examples | 10 | 11 | 12 | 13 | 14 | 15 | 16 | 17 | R18 |
|---|---|---|---|---|---|---|---|---|---|
| Catalyst complexes prepared according to example | 1 | 2 | 3 | 4 | 5 | 6 | 7 | 8 | R9 |
| Weight of catalyst complex employed (mg) | 250 | 159 | 157 | 105 | 108 | 50 | 39 | 36 | 210 |
| Partial pressure of ethylene (kg/cm$^2$) (1) | 8 | 10 | 10 | 10 | 10 | 10 | 10 | 10 | 8 |
| Partial pressure of hydrogen (kg/cm$^2$) (2) | 15 | 10 | 10 | 8 | 5 | 3 | 3 | 2 | 15 |
| Ratio (2)/(1) | 1.9 | 1 | 1 | 0.8 | 0.5 | 0.3 | 0.3 | 0.2 | 1.9 |
| Weight of polyethylene collected (g) | 67 | 88 | 83 | 110 | 111 | 94 | 78 | 98 | 96 |
| Catalyst productivity (g of PE/g of catalyst complex) | 270 | 550 | 550 | 700 | 1,000 | 1,900 | 2,000 | 2,700 | 720 |
| Melt index (g/10 min) (3) | 0.10 | 0.15 | 0.20 | 0.18 | 0.20 | 0.18 | 0.15 | 0.14 | 0.17 |
| Melt index under high load (g/10 min) (4) | 9.02 | 14.42 | 18.67 | 16.27 | 12.01 | 10.93 | 9.28 | 8.22 | 14.8 |
| Ratio (4)/(3) | 90 | 96 | 94 | 90 | 60 | 61 | 62 | 59 | 87 |
| $U_w$ factor | 15 | 13 | 21 | 28 | 26 | 16 | 11 | 13 | 11 |

The experiments summarised in Table III show that it is possible to manufacture, in the presence of the catalyst complexes of the invention, polyethylenes of melt index of the same order of magnitude as the melt indices of the polyethylenes prepared from the catalysts of the prior art (R9), whilst employing much less molecular weight regulator (hydrogen) and further increasing the catalyst productivity.

Figure 2:
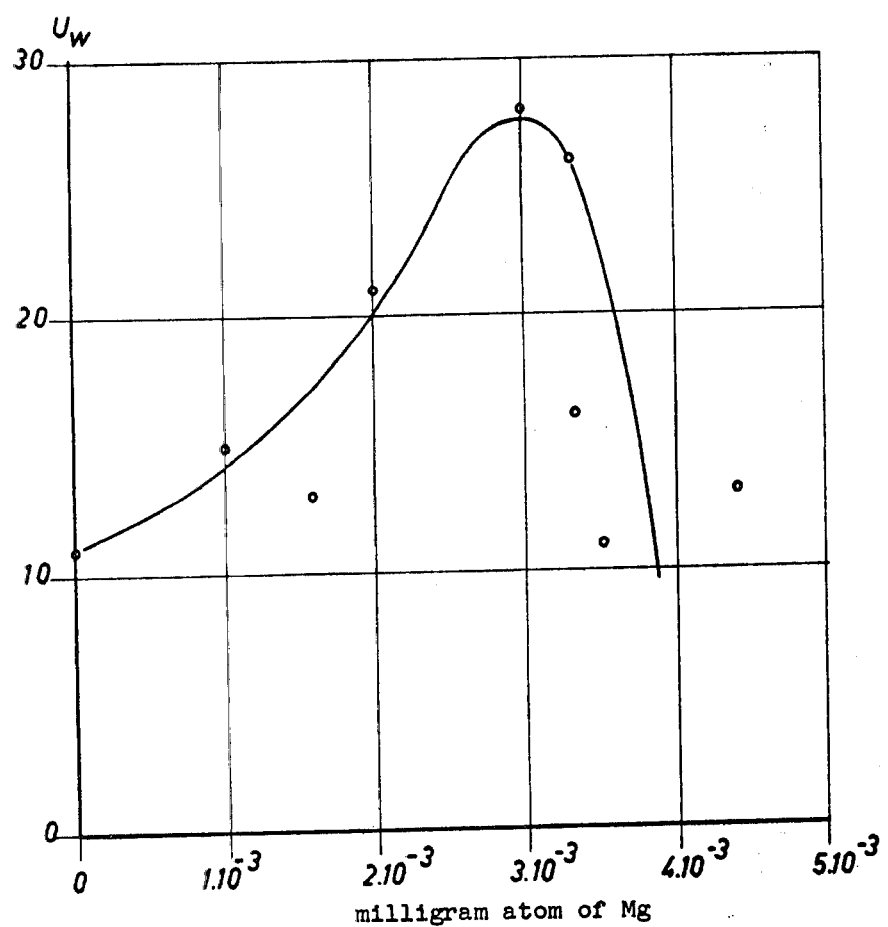

The attached FIG. 1 shows that with the catalyst complexes obtained from solids of magnesium content varying from about $1 \times 10^{-3}$ to $5 \times 10^{-3}$ mg.-atom/m$^2$ of specific surface area, it is possible to lower the ratio of the partial pressures of hydrogen and ethylene up to about 10-fold in order to obtain polyethylenes of comparable melt indices. Finally, Examples 10 to 17 and the attached FIG. 2 show that for the same variation in magnesium content, the factor $U_w$ of the polyethylenes obtained is always higher than the factor $U_w$ for polyethylene obtained in the presence of the catalyst complex bearing reference R9 and that there is an optimum magnesium content of the solids corresponding to a maximum in the values of the factor $U_w$.

EXAMPLES 19 AND 20 AND COMPARISON EXAMPLE R21

A. Preparation of the catalyst complexes

Alumina monohydrate of the α-type (boehmite) sold under the trandemark "Ketjen Grade B" is mixed with about 4% by weight of NH$_4$F and the mixture is heated to a temperature of 700° C. and kept at this temperature for 1 hour. The fluorinated alumina thus obtained is subjected to a heat treatment which is carried out at 700° C. for 5 hours under a nitrogen atmosphere. Its specific surface area is 250 m$^2$/g and its porous volume is 1 cm$^3$/g.

Known quantities of this fluorinated alumina are treated with aqueous solutions of MgCl$_2$.4H$_2$O in the same manner as for the preparation of the catalyst complexes of Examples 1 to 8. The solids obtained are thereafter kept at 250° C. for 16 hours under a nitrogen atmosphere. They are finally treated with TiCl$_4$ in the same manner as in Examples 1 to 8 except that the treatment temperature is 130° C. and that the reaction product is extracted 5 times with boiling TiCl$_4$.

B. Polymerisation tests

The washed and dried products are used as catalyst complexes in polymerisation tests carried out under the common conditions described in paragraph B of Examples 1 to 8. The particular conditions of preparation of these catalysts, the results of their analysis, the particular conditions of the polymerisation and the results of the polymerisation, and the properties of the polyethylenes obtained are summarised in Table IV below, which also indicates the results obtained with a catalyst complex, bearing reference R21, prepared in the same manner as the catalyst complexes described above but omitting the step of treating the fluorinated alumina with magnesium chloride.

TABLE IV

| Particular conditions | Ex. 19 | Ex. 20 | Ex. R21 |
|---|---|---|---|
| Amount of magnesium employed (g of Mg/kg of fluorinated alumina) | 15 | 25 | — |
| Mg content of the solid obtained (mg.-atom/m$^2$)(before treatment at 250° C.) | $2.3 \times 10^{-3}$ | $3.7 \times 10^{-3}$ | — |
| Ti content of the catalyst complex (mg/g) | 13 | 14 | 7.7 |
| F content of the catalyst complex (mg/g) | 23 | 22 | 35 |
| Cl content of the catalyst complex (mg/g) | 61 | 87 | 24 |
| Mg content of the catalyst complex (mg/g) | 14 | 23 | — |
| Weight of catalyst complex employed (mg) | 107 | 51 | 140 |
| Amount of triisobutyl-aluminium employed (mg) | 100 | 100 | 200 |
| Partial pressure of ethylene (1) (kg/cm$^2$) | 10 | 10 | 8 |
| Partial pressure of hydrogen (2) (kg/cm$^2$) | 10 | 5 | 15 |
| Ratio (2)/(1) | 1 | 0.5 | 1.9 |
| Weight of polyethylene (PE) collected (g) | 80 | 99 | 103 |
| Catalyst productivity (g of PE/g of catalyst complex) | 750 | 2,000 | 736 |
| Melt index (g/10 min) (3) | 0.10 | 0.11 | 0.23 |
| Melt index under high load (g/10 min) (4) | 7.98 | 10.15 | 11.5 |
| Ratio (4)/(3) | 80 | 92 | 50 |
| $U_w$ factor | 12 | 13 | 10 |

Examination of Table IV shows once again that there is an optimum magnesium content of the solids by means of which the catalyst complexes of the invention are prepared, corresponding to a maximum catalyst productivity and allowing the production of a polyethylene of comparable melt index, and of a higher $U_w$ factor, than those of the polyethylene obtained in the presence of the catalyst complex bearing reference R21, with a much lower ratio of the partial pressures of hydrogen and of ethylene.

EXAMPLE 22

A complex oxide of general formula $MgO.Al_2O_3$ (spinel) is subjected to a heat treatment carried out under a stream of dry nitrogen at 900° C. for 5 hours. A complex oxide characterised by a specific surface area of 290 m$^2$/g and an internal porosity of 1.5 cm$^3$/g is obtained. This complex oxide is treated with an aqueous solution of $MgCl_2.4H_2O$ in the same manner as in Examples 1 to 8, the amount of magnesium employed being 15 g of magnesium/kg of complex oxide. The magnesium content of the solid obtained, attributable solely to the fixing of the magnesium cloride, is hence $4.6 \times 10^{-3}$ mg.-atom of Mg/m$^2$ of specific surface area. After an activation treatment carried out at 250° C. for 16 hours and after the reaction with $TiCl_4$ carried out as indicated in Examples 2 to 8, the catalyst complex obtained contains 19 mg of titanium and 111 mg of chlorine per gram. A polymerisation test carried out with 41 mg of this complex under the common conditions detailed in paragraph B of Examples 1 to 8 and under partial pressures of ethylene and of hydrogen respectively equal to 10 and 2 kg/cm$^2$ allows 68 g of polyethylene to be obtained, the melt index of the polyethylene being 0.16 g/10 min and the melt index under high load being 8.07 g/10 min. The catalyst productivity is 1,650 g of PE/g of catalyst complex and the specific activity is 8,700 g of PE/hr$\times$g of Ti$\times$kg/cm$^2$ of $C_2H_4$. The $U_w$ factor of the polyethylene is 6.

By way of comparison, a polymerisation test carried out under the above conditions with 60 mg of a catalyst complex prepared in the same manner, but without treating the complex oxide with a magnesium halide compound (Ti content: 13 mg/g) allowed 25 g of polyethylene to be obtained, of which the melt index could not be measured and the melt index under high load was 0.61 g/10 min. The catalyst productivity and specific activity are respectively 420 g of PE/g of catalyst complex and 3,200 g of PE/hr$\times$g of Ti$\times$kg/cm$^2$ of $C_2H_4$.

EXAMPLE 23

To prepare the catalyst complex used in this test, 12.4 g of magnesium ethylene $Mg(OC_2H_5)_2$ sold by DYNAMIT NOBEL are added to 17 g of titanium tetrabutylate $Ti(OC_4H_9)_4$ sold by TITANGESELLSCHAFT and the mixture is heated at 130° C. for 6 hours, whilst stirring. It is found that the magnesium ethylate dissolves practically completely. The atomic ratio Ti/Mg in the mixture is 0.5 g atom/g atom to within an error of ±10% due to the impurities which the compounds employed contain. 60 cm$^3$ of hexane are added to the mixture thus obtained which has beforehand been cooled to 90° C., and the whole is kept at this temperature for 1 hour, whilst stirring. The solution thus obtained is adjusted to a volume of 120 cm$^3$ by adding hexane.

18.5 cm$^3$ of this solution (this volume containing about 0.4 g of magnesium) are gradually introduced into 100 cm$^3$ of a suspension containing 21 g of a fluorinated alumina prepared in accordance with item A of Examples 19 and 20. The mixture thus formed is stirred for 15 minutes at ambient temperature and is allowed to settle out, and the supernatant liquid is then removed. Analysis shows that the magnesium content fixed to the solid thus obtained is $2.2 \times 10^{-3}$ mg.-atom/m$^2$ of specific surface area. The solid thus obtained is suspended firstly in 140 cm$^3$ of $TiCl_4$ whilst stirring for 2 hours at ambient temperature and then, after removing the first lot of $TiCl_4$, in an identical volume of $TiCl_4$ for 30 minutes at 120° C. Finally, the catalyst complex obtained is isolated, washed with hexane until there are no further chloride ions in the wash liquid, and dried under a stream of dry nitrogen. The complex contains 18 g of titanium, 21 g of fluorine, 65 g of chlorine and 14 g of magnesium per kg. A polymerisation test carried out under the same conditions as the first series of polymerisation tests (Examples 1 to R9) and with 55 mg of catalyst complex makes it possible to obtain 117 g of polyethylene of melt index 0.14 g/10 min and of melt index under high load of 11.03 g/10 min. Their ratio is thus about 79 and the $U_w$ factor of the polyethylene is 11. The catalyst productivity is 2,100 g of PE/g of catalyst complex and the specific activity is 11,700 g of PE/hr$\times$g of Ti$\times$kg/cm$^2$ of $C_2H_4$.

If the results of this test are compared with those of the comparison example R21 it is again seen that it is possible to obtain, in the presence of the catalyst complexes of the invention, a polyethylene of comparable melt index and of higher $U_w$ factor, with a much lower ratio of the partial pressures of hydrogen and of ethylene.

EXAMPLE 24

To prepare the catalyst complex used in this test, the hydrated magnesium chloride used in Examples 1 to 8 is first heated to 185° C. until the monohydrate is obtained. 15.5 g of magnesium chloride monohydrate thus obtained are added to 85 g of titanium tetrabutylate and the mixture is heated for 6 hours at 130° C., whilst stirring. It is found that the magnesium chloride dissolves practically completely. In this mixture, the atomic ratio Ti/Mg is 2 g atoms/g atom to within an error of ±10% due to impurities present in the compounds employed. 300 cm$^3$ of hexane are added to the cooled mixture and the whole is heated to 90° C. for 1 hour, whilst stirring. The soluble fraction is recovered from the cooled mixture and analysis of this fraction shows that it contains 6.5 g of Mg/l.

20 g of a fluorinated alumina prepared in accordance with item A of Examples 19 and 20, suspended in 100 cm$^3$ of hexane, are thereafter treated with 56 cm$^3$ of the soluble fraction of the above mixture. The sequence of preparation of the catalyst complex is the same as that described in Example 23. The solid obtained contains $2.5 \times 10^{-3}$ mg-atom of Mg/m$^2$ of specific surface area. The catalyst complex contains 24 g of titanium, 23 g of fluorine and 73 g of chlorine and 11 g of magnesium per kg. A polymerisation test carried out under the same conditions as in Example 23, with 52 mg of catalyst complex, makes it possible to obtain 69 g of polyethylene of melt index (1) 0.18 g/10 min, of melt index under high load (2) 10.67 g/10 min and of a $U_w$ factor of 19. The ratio of (2)/(1) is about 59. The catalyst productivity is 1,350 g of PE/g of catalyst complex and the specific activity is 5,600 g of PE/hr$\times$g of Ti$\times$kg/cm$^2$ of $C_2H_4$.

EXAMPLE 25

12 g of activated alumina prepared as under item A of Examples 1 to 8 are treated with 24 cm$^3$ of a solution containing 18 g/l of magnesium methylate, Mg(OCH$_3$)$_2$ (sold by DYNAMIT NOBEL) in methanol. The treatment is carried out in such a way that the reaction mixture retains its pulverulent character. The solid obtained is dried in vacuo at 50° C. for 1 hour. Its magnesium content is $1.1 \times 10^{-3}$ mg.-atom/m$^2$ of specific surface area. This solid is thereafter treated with TiCl$_4$ as mentioned under item A of Examples 1 to 8. According to analysis, the catalyst complex obtained contains 20 g of titanium, 90 g of chlorine and 9.7 g of magnesium per kg.

A polymerisation test carried out under the general conditions mentioned under item B of Examples 1 to 8, but with 102 mg of catalyst complex and under partial pressures of ethylene and of hydrogen of 10 kg/cm$^2$ and of 6 kg/cm$^2$, respectively, allows 71 g of polyethylene to be obtained, having a melt index (1) of 0.19 g/10 min, a melt index under high load (2) of 12.65 g/10 min and a U$_w$ factor of 16. The ration (2)/(1) is about 67. The catalyst productivity is 700 g of PE/g of catalyst complex and the specific activity is 3,500 g of PE/hr$\times$g of Ti$\times$kg/cm$^2$ of C$_2$H$_4$.

What is claimed is:

1. A process for the low pressure polymerization and copolymerization of alpha-olefins which comprises conducting the polymerization and copolymerization in the presence of a catalyst system comprising:
   (a) an organic compound of a metal of Groups IA, IIA, IIB, IIIA and IVA of the Periodic Table, being selected from alkyl metal compounds, alkyl metal hydrides and alkyl metal halides; and
   (b) a solid catalyst complex, said complex prepared by reacting (1) a transition metal compound of the metals of Groups IVB, VB and VIB of the Periodic Table selected from halides, oxyhalides, alkoxyhalides, oxyalkoxides, and alkoxides with (2) a porous aluminum oxide having an internal porosity of greater than 0.3 cm$^3$/g and a specific surface area of between 200 and 400 m$^2$/g on which is chemically attached an amount of magnesium compound selected from organic oxygen containing magnesium compounds containing only C$_1$-C$_{20}$ organic radical bonded to magnesium via oxygen and magnesium dihalides, said amount being such that between $1 \times 10^{-3}$ and $5 \times 10^{-3}$ milligram-atom of magnesium is present per square meter of specific surface area of the porous oxide and the magnesium compound having been chemically attached on the porous aluminum oxide in a liquid medium, said medium being in the form of water or of an organic diluent.

2. The process according to claim 1 in which the metal of the organic compound (a) is aluminum and the transition metal is titanium.

3. The process according to claim 1 wherein the magnesium compound is a magnesium alkoxide or phenoxide.

4. The process according to claim 1 wherein the magnesium compound is chemically attached on the porous aluminum oxide in the presence of an oxygen-containing organic compound (M) of a metal of Groups IA, IIB, IIIA, IVA, IVB, VB, VIB, VIIB and VIII of the Periodic Table.

5. Process according to claim 4 wherein the oxygen-containing organic compound (M) is a compound of the general formula [MeO$_x$(OR)$_y$]$_m$ wherein Me is a metal selected from lithium, sodium, potassium, zinc, boron, aluminum, silicon, tin, titanium, zirconium, vanadium, chromium, manganese, iron, cobalt, and nickel, R is an organic radical containing from 1 to 20 carbon atoms, x and y are any number such that $x \geqq o$ and $y > o$ compatible with the valency of the metal Me, and m is an integer.

6. The process according to claim 5 wherein the metal Me is aluminum, silicon, titanium, zirconium, vanadium, or chromium, R is a hydrocarbon radical containing from 1 to 6 carbon atoms, x is such that $o \leqq x \leqq 1$ and m is such that $1 \leqq m \leqq 6$.

7. The process according to claim 4 wherein the magnesium compound is chemically attached on the porous aluminum oxide in the form of a solution in an organic diluent or of a mixture of the magnesium compound with the oxygen-containing organic compound (M).

8. The process according to claim 4 wherein the magnesium compound and the oxygen containing organic compound (M) are mixed in such amounts that the atomic ratio of the metal Me of the oxygen-containing organic compound to magnesium is between 0.5 and 100 gram atom/gram atom.

9. The process according to claim 1 wherein the porous aluminum oxide is a complex oxide of aluminum and at least one other metal.

10. The process according to claim 1 wherein the porous aluminum oxide is subjected to a halogenation treatment before being brought into contact with the magnesium compound.

11. The process according to claim 10 wherein the porous aluminum oxide is a fluorinated alumina such that the atomic ratio of fluorine/aluminum is between 0.01 and 1.

12. The process according to claim 1 wherein the magnesium compound is chemically attached on the porous aluminum oxide in the form of a solution in water or in an organic diluent which is capable of dissolving said magnesium compound.

* * * * *